United States Patent [19]

Frey

[11] Patent Number: 5,006,040
[45] Date of Patent: Apr. 9, 1991

[54] APPARATUS FOR FORMING SETS OF ACCUMULATOR PLATES

[75] Inventor: Helmut Frey, Ferlach, Austria

[73] Assignee: Akkumulatorenfabrik Dr. Leopold Jungfer, Feistritz im Rosental, Austria

[21] Appl. No.: 530,228

[22] Filed: May 30, 1990

[30] Foreign Application Priority Data

Jun. 7, 1989 [AT] Austria ............................... 1400/89

[51] Int. Cl.⁵ ............................................... B65G 57/14
[52] U.S. Cl. ............................. 414/789.9; 414/794.4; 414/790.7; 414/791; 29/623.1
[58] Field of Search .................. 414/788.9, 789, 789.5, 414/789.6, 789.9, 790.7, 794.4, 791, 900; 198/418.3; 29/623.1, 623.2, 623.4, 730

[56] References Cited

U.S. PATENT DOCUMENTS

| | | | |
|---|---|---|---|
| 2,652,933 | 9/1953 | Willard et al. | 29/730 |
| 2,870,921 | 1/1959 | Winkel | 414/789.6 X |
| 3,596,575 | 8/1971 | Brockmuller | 414/790.7 X |
| 3,910,425 | 10/1975 | Mahara et al. | 414/789.5 |
| 3,915,316 | 10/1975 | Pomara | 414/789 |
| 4,006,831 | 2/1977 | Jimenez | 414/789 |
| 4,767,321 | 8/1988 | Chilva | 198/418.3 |

Primary Examiner—David A. Bucci
Assistant Examiner—Brian Dinigola
Attorney, Agent, or Firm—Karl Hormann

[57] ABSTRACT

Apparatus for forming sets of accumulator plates, with an endless conveyor chain (1) for pairs of plates following one another at an interval, and each consisting of a plate jacketed in a separator and an antiplate lying thereon, a plane of conveyance of the conveyor chain being higher than the plane of conveyance of an endless conveyor band (5) located downstream in the direction of conveyance for accepting an end plate of a set from a magazine and/or a pair of plates consisting of a jacketed plate and antiplate supplied by the conveyor chain (1), whereas the plane of conveyance of an endless removal belt (12), located downstream of the conveyor belt (5) in the direction of conveyance, is arranged lower than the plane of conveyance of the conveyor belt, and wherein in the movement zone both of the conveyor belt (5) and of the removal belt (12) stop devices (10,13) are provided for the plates (3,4,6) or sets of plates (15).

3 Claims, 1 Drawing Sheet

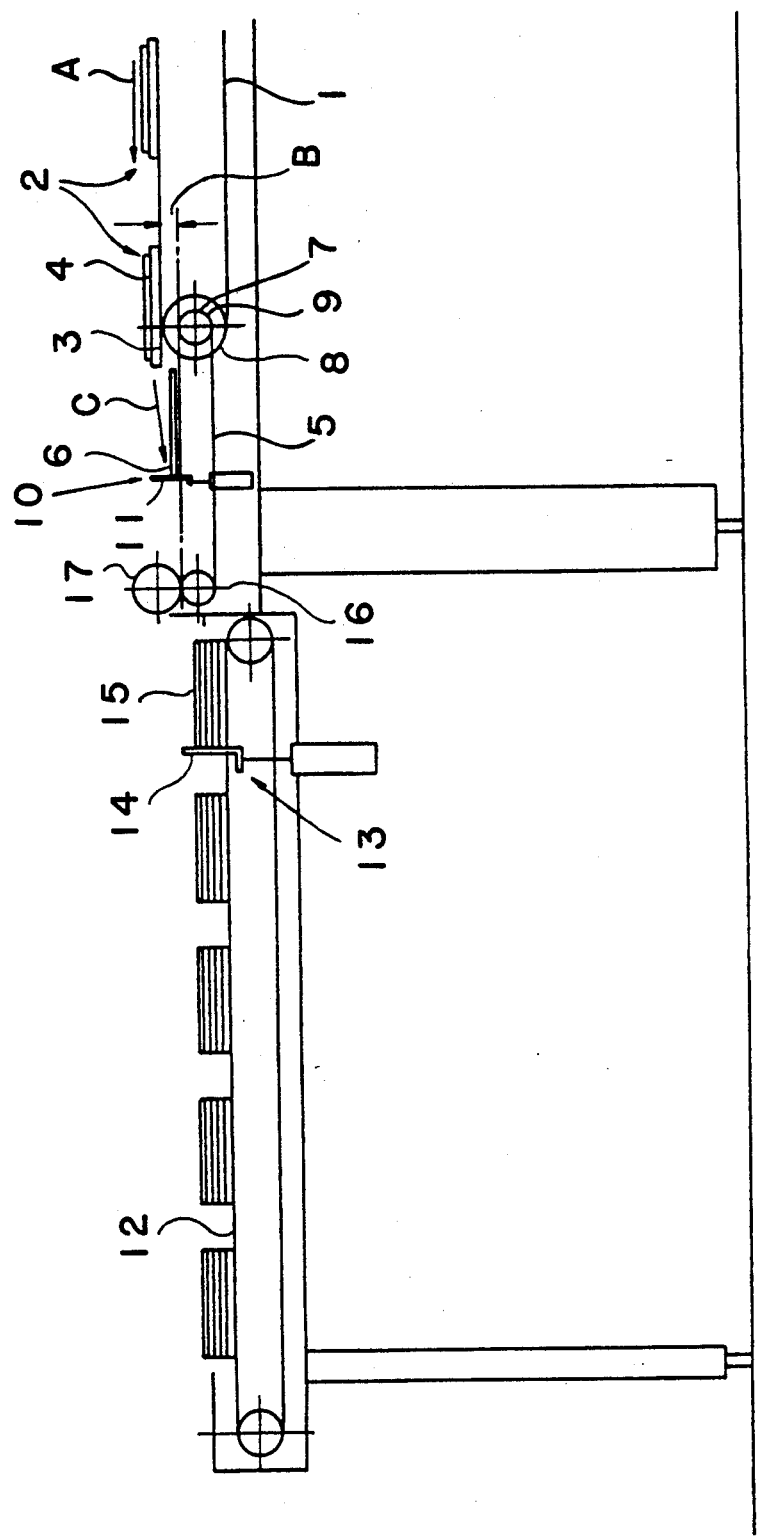

APPARATUS FOR FORMING SETS OF ACCUMULATOR PLATES

The invention relates to an apparatus for forming sets of accumulator plates with a first conveyor device for pairs of plates, following one after another at an interval and each consisting of a plate jacketed in a separator and an antiplate lying thereupon, and with a vertically adjustable endless removal belt, located downstream of the conveyor device in the direction of conveyance, for forming a set of plates and removing the same.

In the case of an apparatus of this type, end plates have previously been deposited by hand onto the sets of plates formed, which not only led to inaccuracies and, in some cases, to deviations from the desired end plate position, but also entailed a considerable expenditure of work.

It is the object of the invention to create an apparatus for forming sets of accumulator plates that avoids the disadvantages set forth, and enables automatic formation of sets including the end plates with a high accuracy.

This object is achieved according to the invention in that the first conveyor device is formed by an endless conveyor chain whose plane of conveyance is higher than the plane of conveyance of an endless conveyor belt, located downstream of the conveyor chain in the direction of conveyance, for accepting an end plate of a set supplied from a magazine and/or of a pair of plates consisting of jacketed plate and antiplate and supplied by the conveyor chain, whereas the plane of conveyance of the removal belt is arranged lower than the plane of conveyance of the conveyor belt, and in that in the movement zone both of the conveyor belt and of the removal belt stop devices are provided for the plates and sets of plates.

These measures ensure accurate positioning of each end plate and of the plates deposited thereupon, and automated formation of the sets of plates.

According to a preferred embodiment of the invention, the conveyor belt is assigned an elastic pressure roller at its discharge end. This guarantees an exact transfer to the removal belt enabling the formation of sets.

Further features of the invention are described in more detail below with reference to the diagrammatic drawing, which shows a device according to the invention in side view.

Pairs of plates 2, following one after another at an interval, are deposited on an endless, continuously moved conveyor chain 1, which consists of a plurality of parallel individual chains, e.g. roller chains. Each pair of plates 2 consists of a plate 3 jacketed in a separator, and an antiplate 4 lying thereupon. Arranged adjoining the conveyor chain 1 in its direction of conveyance (arrow A) is a conveyor belt 5, on which there is deposited in each case an end plate 6 taken from an end plate magazine, indicated standing perpendicular to the direction of conveyance. Between the plane of conveyance of the conveyor chain 1 and the plane of conveyance of the conveyor belt 5 there is a difference in level B, which is preferably determined by the superior strength of the conveyor chain 1 by comparison with the conveyor belt 5, or by virtue of the fact that the guide wheel 8 of the conveyor chain 1 and the guide pulley 9 of the conveyor belt 5 are mounted on a common axis 7, the diameter of the deflector wheel 8 of the conveyor chain 1 being larger than the diameter of the corner pulley 9 of the conveyor belt 5.

A first stop device 10 is arranged in the path of travel of the conveyor belt 5, which consists of at least two individual belts, round cords or the like, and consists, for example, of a locking bar 11, which is operated pneumatically, hydraulically or electromechanically and is arranged capable of being raised and lowered, preferably in the vertical direction between the belts, cords or the like of the conveyor belt 5, in order to arrest the end plate 6 deposited on the conveyor belt 5 until, as determined by the difference in level B, a pair of plates 2 coming from the conveyor chain 1 is pushed in the direction of the arrow C onto the end plate 6. Subsequently, the locking bar 11 is lowered, so that the stack of plates formed in this way is passed on via the conVeyor belt 5 to a removal belt 12, which COnsists of at ]east two parallel belts, round cords or the like, is operated intermittently and is provided beyond the conveyor belt 5 in the direction of conveyance, the plane of conveyance of the removal belt 12 being lower than the plane of conveyance of the conveyor belt 5.

Arranged in the path of travel of the removal belt 12 is a second stop device 13, which, for example, likewise consists of a locking bar 14, which is operated pneumatically, hydraulically or electromagnetically and is capable of being raised and lowered, preferably in the vertical direction between the belts, cords or the like of the removal belt 12, in order to arrest the stack, passed over from the conveyor belt 5, of end plate 6 and pair of plates 2 until a predetermined number of further pairs of plates 2 has been passed over from the conveyor belt 5. After lowering of the bar 14, the set of plates 15 formed in this way is conveyed further by one step on the removal belt 12, the bar 11 in the region of the conveyor belt 5 simultaneously being raised, in order to arrest the end plate 6 next deposited, whereupon the outlined process is repeated.

The removal belt 12 is constructed so as to be vertically adjustable for the purpose of matching the sets of plates 15 formed on the removal belt 12 to a predetermined number of plates.

In order for the stacks of plates or pairs of plates passed on from the conveyor belt 5 to the removal belt 12 to maintain their position with respect to one another when being transferred, a pressure roller 17 of elastomeric material is arranged above the end guide pulley 16 of the conveyor belt 5, with which pulley it cooperates.

It goes without saying that the individual conveyor devices and the stop devices are driven in a synchronized fashion by means of a control device.

I claim:

1. In an apparatus for forming sets of accumulator plates, said apparatus having a first conveyor device for a sequence of pairs of plates, consisting of a plate jacketed in a separator and an antiplate lying thereupon; and a vertically adjustable endless removal belt, located downstream of said conveyor device in the direction of conveyance, for forming a set of plates and removing the same, the improvement wherein said first conveyor device is formed by an endless conveyor chain and an endless conveyor belt located downstream of said conveyor chain in the direction of conveyance, and having, a plane of conveyance lower than a plane of conveyance of said conveyor chain, whereby said conveyor belt is adapted to receive an end plate of a said set from a magazine and said pairs of plates of a said set from said conveyor chain; and wherein a plane of conveyance of said removal belt is lower than said plane of conveyance of said conveyor belt; and wherein both said conveyor belt and said removal belt are provided with stop devices for engaging said plates or sets of plates.

2. Apparatus according to claim 1, wherein said conveyor belt is provided with an elastic pressure roller at a discharge end thereof.

3. Apparatus according to claim 1, wherein said stop devices are formed by pneumatically, hydraulically or electromechanically operated locking bars.

* * * * *